(12) United States Patent
Takahashi et al.

(10) Patent No.: US 9,681,258 B2
(45) Date of Patent: Jun. 13, 2017

(54) RADIO COMMUNICATION APPARATUS, RADIO COMMUNICATION METHOD, COMPUTER-READABLE MEDIUM, SLAVE DEVICE, AND MASTER DEVICE

(71) Applicant: CASIO COMPUTER CO., LTD., Shibuya-ku, Tokyo (JP)

(72) Inventors: Toshihiro Takahashi, Hamura (JP); Takahiro Tomida, Kunitachi (JP); Tsutomu Terazaki, Saitama (JP); Ryo Okumura, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 152 days.

(21) Appl. No.: 14/661,931

(22) Filed: Mar. 18, 2015

(65) Prior Publication Data

US 2015/0271825 A1    Sep. 24, 2015

(30) Foreign Application Priority Data

Mar. 19, 2014    (JP) ................. 2014-055861

(51) Int. Cl.
*H04W 4/00*    (2009.01)
*H04W 8/00*    (2009.01)
*H04W 84/20*   (2009.01)

(52) U.S. Cl.
CPC ........... *H04W 4/008* (2013.01); *H04W 8/005* (2013.01); *H04W 84/20* (2013.01)

(58) Field of Classification Search
CPC .......... H04W 72/005; H04W 72/0453; H04W 4/008; H04W 84/20; H04W 28/24; H04W 72/04
USPC ....... 370/329, 335, 328, 310, 347, 477, 389, 370/390, 349, 312; 455/450
See application file for complete search history.

(56) References Cited

U.S. PATENT DOCUMENTS

| 2007/0077883 | A1* | 4/2007 | Childers | ................ | H04H 20/61 455/3.05 |
| 2009/0291644 | A1* | 11/2009 | Suwa | ..................... | H04B 1/005 455/77 |
| 2011/0195706 | A1* | 8/2011 | Nakamori | ............. | H04W 24/10 455/423 |
| 2013/0039319 | A1* | 2/2013 | Shi | ........................ | H04L 5/0023 370/329 |

FOREIGN PATENT DOCUMENTS

JP    2012142877 A    7/2012

* cited by examiner

*Primary Examiner* — Chi H Pham
*Assistant Examiner* — Alexander O Boakye
(74) *Attorney, Agent, or Firm* — Holtz, Holtz & Volek PC

(57) ABSTRACT

When executing a predetermined application in which radio communication with a slave device is necessary, a master device scans an advertisement from the slave device by using previously-set one channel among three channels for advertising. When transmitting the advertisement to the master device executing the predetermined application, the slave device transmits the advertisement by using previously-set one channel among three channels for advertising.

11 Claims, 11 Drawing Sheets

FIG. 2

| RF Center Frequency [MHz] | Data Channel Index | Advertising Channel Index |
|---|---|---|
| 2402 | | 37 |
| 2404 | 0 | |
| 2406 | 1 | |
| 2408 | 2 | |
| 2410 | 3 | |
| ⋮ | ⋮ | ⋮ |
| 2422 | 9 | |
| 2424 | 10 | |
| 2426 | | 38 |
| 2428 | 11 | |
| 2430 | 12 | |
| ⋮ | ⋮ | ⋮ |
| 2476 | 35 | |
| 2478 | 36 | |
| 2480 | | 39 |

RADIO COMMUNICATION APPARATUS, RADIO COMMUNICATION METHOD, COMPUTER-READABLE MEDIUM, SLAVE DEVICE, AND MASTER DEVICE

BACKGROUND

1. Technical Field

An embodiment of the present invention relates to a radio communication apparatus, a radio communication system, a radio communication method, a computer-readable medium, a slave device, and a master device.

2. Related Art

A master device, which is a radio communication device to perform radio communication based on Bluetooth (registered trademark) lowenergy which is a near field communication standard, receives identification information transmitted periodically from a slave device which is a different radio communication device to be a communication partner, the identification information being called an advertisement. Then, after transmitting a connection request to the slave device, the master device performs transmission/reception of data with the slave device (see, for example, JP 2012-142877 A).

As described above, in the radio communication device to perform radio communication based on the Bluetooth (registered trademark) lowenergy, the slave device uses three channels, which is previously assigned for advertising, for advertising among 40 channels in total in a frequency band. However, performing advertising by constantly using the three channels causes wasteful power consumption in a case where communication between a specific slave device and a master device is performed.

An embodiment of the present invention has been provided in view of the forgoing and is to provide a slave device to control wasteful power consumption.

SUMMARY

A radio communication apparatus configured to perform radio communication with a first radio communication apparatus includes: a control unit configured to determine, as a frequency band used for establishing connection with the first radio communication apparatus, M (M is natural number smaller than N) frequency band from predetermined N (N is natural number equal to or larger than two and smaller than communicable frequency band number) frequency bands when at least one predetermined condition related to radio communication between the radio communication apparatus and the first radio communication apparatus is satisfied and to determine the N frequency bands when the at least one predetermined condition is not satisfied; and a communication unit configured to transmit identification information to the first radio communication apparatus by using the frequency band determined by the control unit.

According to an embodiment of the present invention, wasteful power consumption can be controlled.

BRIEF DESCRIPTION OF THE DRAWINGS

FIG. 2 is a view illustrating a table indicating assignment of a frequency band in radio communication based on Bluetooth (registered trademark) lowenergy;

DETAILED DESCRIPTION

In the following, an embodiment of the present invention will be described with reference to the drawings.

(First Embodiment)

Figure 1:
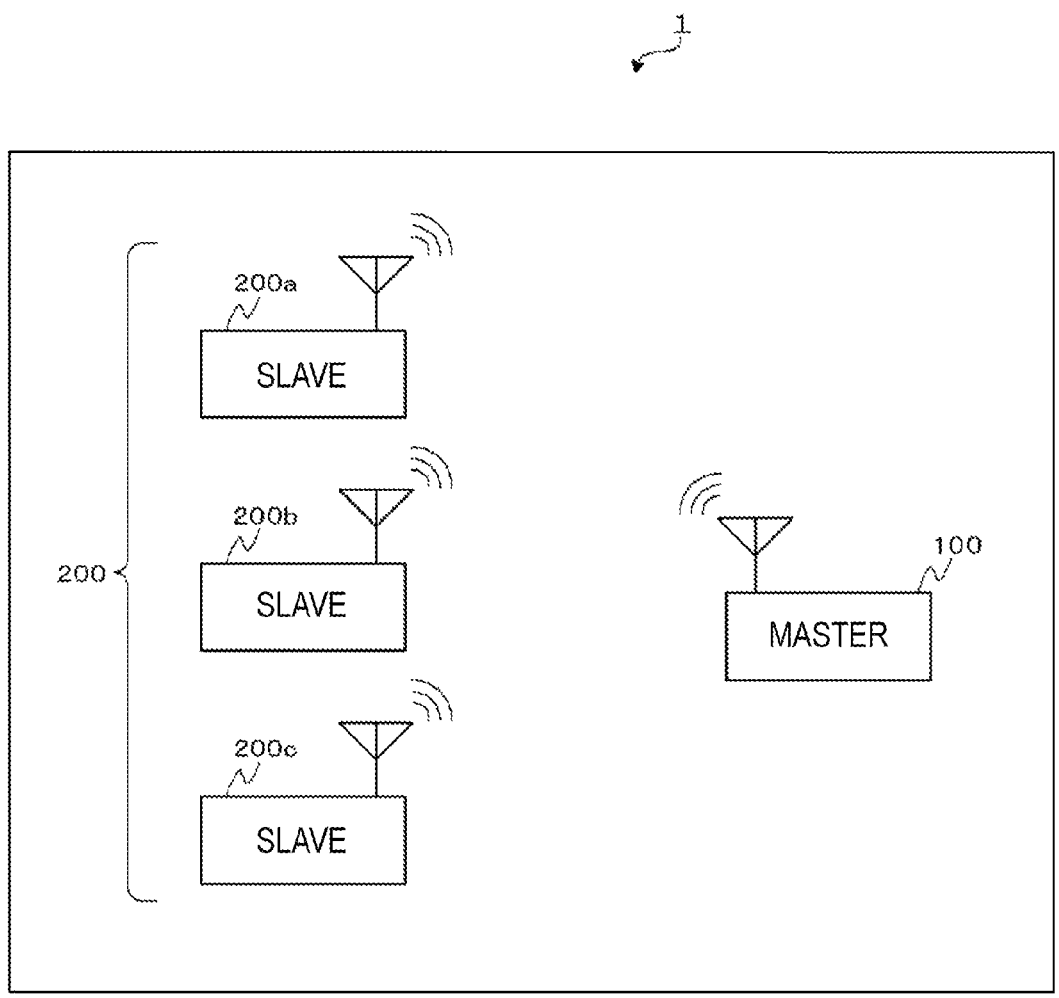
FIG. 1 is a view illustrating a configuration example of a radio communication system according to a first embodiment of the present invention.

FIG. 1 is a view illustrating a configuration example of a radio communication system 1 according to the first embodiment of the present invention.

In the configuration example illustrated in FIG. 1, the radio communication system 1 includes a master device 100 as a radio communication apparatus, and a plurality of slave devices 200 (200a to 200c) as radio communication apparatuses different from the master device 100. The master device 100 and the slave devices 200 perform radio communication with each other based on Bluetooth (registered trademark) lowenergy (hereinafter, referred to as BLE). The BLE is a standard (mode) designed for low power consumption in a near field radio communication standard called the Bluetooth (registered trademark). The master device 100 is a device to use a service (such as measurement data) provided by the slave device 200. Also, the slave device 200 is a device to provide a service (such as measurement data) to the master device 100.

The master device 100 is a device such as a mobile phone, a smartphone, a tablet-type personal computer, or a notebook-type personal computer and is a terminal including a radio communication function which is based on the BLE. In the present embodiment, for example, the master device 100 includes a smartphone. The master device 100 receives various kinds of data from the slave device 200. Based on the received data, the master device 100 displays various kinds of information on a display unit 128 described later or makes sound such as an alarm from a speaker 124 described later (see FIG. 3).

The slave device 200 notifies an outline of a service held therein to the master device 100 and performs transmission of an advertisement to wait for a connection request from the master device 100.

In the radio communication performed based on the BLE, before transmission/reception of data between the master device 100 and the slave device 200 is performed, the slave device 200 transmits an advertisement and the master device 100 receives the advertisement. The advertisement is identification information to make a different radio communication apparatus know an existence of the self in order to search for the different radio communication apparatus or to connect with the different radio communication apparatus.

In the first embodiment, the slave device 200 transmits an advertisement to the master device 100. Here, a frequency band (channel) of the advertisement transmitted from the slave device 200 will be described.

In FIG. 2, a table indicating assignment of a frequency band and a channel in the BLE is illustrated. As illustrated in FIG. 2, in the BLE, a frequency band of 2400 MHz to 2483.5 MHz is divided into 40 channels having a width of 2 MHz when used. Among the 40 channels, three channels for advertising in which center frequencies (RF Center Frequency) are 2402, 2426, and 2480 MHz (channel having 37, 38, and 39 as advertising channel indexes) are used for advertising. The remaining 37 channels for data communication (channels having 0 to 36 as data channel indexes) are used for data communication after connection between the master device 100 and the slave device 200 is established.

Here, in radio communication which is in a related art and which is based on the BLE, the slave device performs advertising by constantly using the above three channels. On the other hand, in the slave device 200 according to the first embodiment, advertising is performed by using one predetermined channel for advertising in a case of performing radio communication with the master device 100 executing a predetermined application. In other cases, advertising is performed by using three channels for advertising. Here, the predetermined application is an application in which radio communication with the slave device 200 is necessary and is, for example, an application for acquiring data to acquire, from the slave device 200, data measured by a sensor (not illustrated) included in the slave device 200. Also, the one predetermined channel for advertising is previously determined by a user or the like and is set in the master device 100 and the slave device 200.

Next, a hardware configuration of the radio communication system 1 according to the first embodiment will be described.

Figure 3:
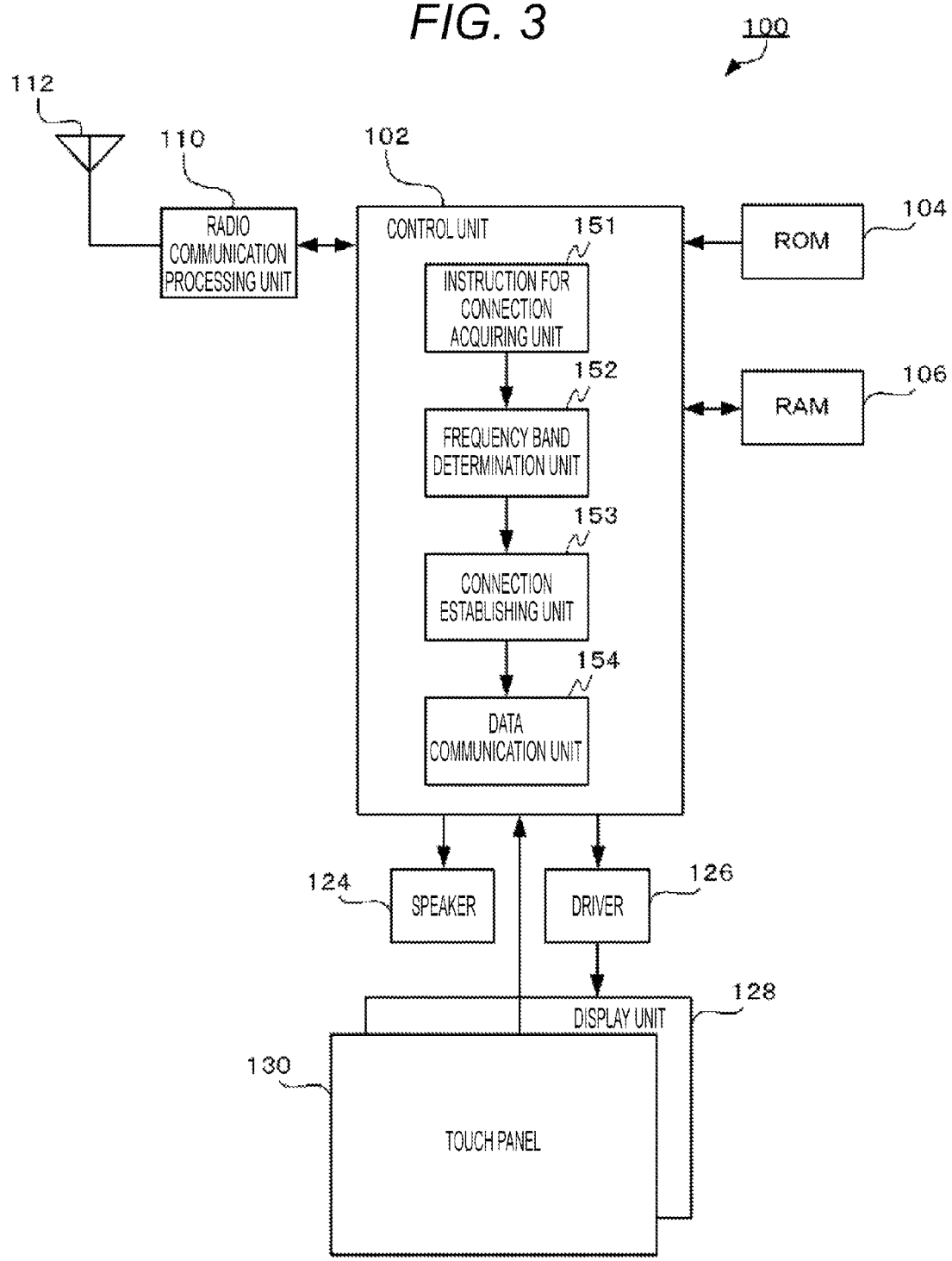
FIG. 3 is a view illustrating a configuration example of a master device according to the first embodiment of the present invention.

FIG. 3 is a block diagram schematically illustrating a configuration example of the master device 100 according to the first embodiment. As illustrated in FIG. 3, the master device 100 includes a control unit 102, read only memory (ROM) 104, random access memory (RAM) 106, a radio communication processing unit 110, an antenna 112, a speaker 124, a driver 126, a display unit 128, and a touch panel 130.

Figure 6:
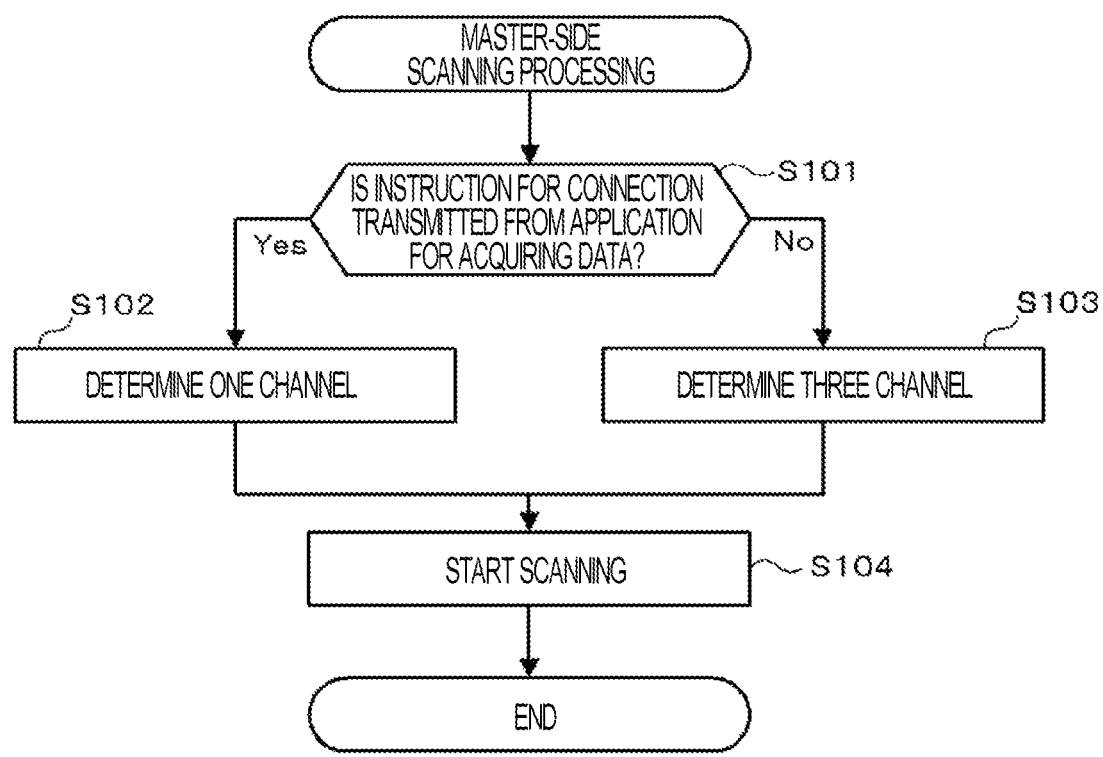
FIG. 6 is a flowchart illustrating an example of master device-side scanning processing executed by the master device according to the first embodiment of the present invention.

The control unit 102 includes, for example, a central processing unit (CPU). By executing software processing according to a program (such as program to realize operation of master device 100 which operation is illustrated in FIG. 6 described later) stored in the ROM 104, the control unit 102 controls various functions included in the master device 100.

The ROM 104 includes non-volatile memory such as flash memory and stores a program or data with which the control unit 102 controls various functions, as described above. In the present embodiment, for example, one channel for advertising used in scanning of an advertisement, which is transmitted from the slave device 200, during execution of a predetermined application is recorded in the ROM 104.

The RAM 106 includes volatile memory and is used as a work area where the control unit 102 temporarily stores data to perform various kinds of processing.

The radio communication processing unit 110 includes, for example, a radio frequency (RF) circuit or a baseband (BB) circuit. The radio communication processing unit 110 performs transmission and reception of a radio signal based on the BLE through the antenna 112.

The speaker 124 outputs sound such as an alarm based on sound data from the control unit 102. The driver 126 outputs, to the display unit 128, an image signal which is based on image data output from the control unit 102. The display unit 128 includes, for example, a liquid crystal display (LCD) or an electroluminescence (EL) display. The display unit 128 displays an image according to the image signal output from the driver 126.

The touch panel 130 is an interface which is arranged on an upper surface of the display unit 128 and is used to input operation contents performed by a user. The touch panel 130 includes, for example, a transparent electrode (not illustrated). When a finger or the like of a user is in touch, a position where voltage varies is detected as a contact position and information of the contact position is output to the control unit 102 as an input instruction.

Next, a functional configuration of the control unit 102 of the master device 100 will be described. As illustrated in FIG. 3, the control unit 102 functions as an instruction for connection acquiring unit 151, a frequency band determination unit 152, a connection establishing unit 153, and a data communication unit 154.

The instruction for connection acquiring unit 151 acquires an instruction for connection with the slave device 200 from the application executed by the master device 100. For example, after an application for acquiring data is activated, the instruction for connection acquiring unit 151 acquires predetermined operation on the touch panel 130 performed by a user as the instruction for connection with the slave device 200. Note that the instruction for connection is not limited to what is generated by operation performed by a user. The instruction for connection may be, for example, what is generated based on passage of predetermined timer time after the application is activated.

The frequency band determination unit 152 determines whether an application which outputs the instruction for connection acquired by the instruction for connection acquiring unit 151 is a predetermined application. Then, when determining that the application which outputs the instruction for connection is the predetermined application, the frequency band determination unit 152 determines one channel for advertising, which is previously stored in the ROM 104 or the like, as a channel used for scanning. Also, when determining that the application which outputs the instruction for connection is not the predetermined application, the frequency band determination unit 152 determines three channels for advertising as channels used for scanning.

The connection establishing unit 153 performs scanning by using the channel determined by the frequency band determination unit 152. Then, the connection establishing unit 153 transmits a connection request to the slave device 200 which transmits the advertisement received by the channel and establishes connection with the slave device 200.

After the connection with the slave device 200 is established by the connection establishing unit 153, the data communication unit 154 performs data communication with the slave device 200 by using 37 channels for data communication illustrated in FIG. 2.

Figure 4:
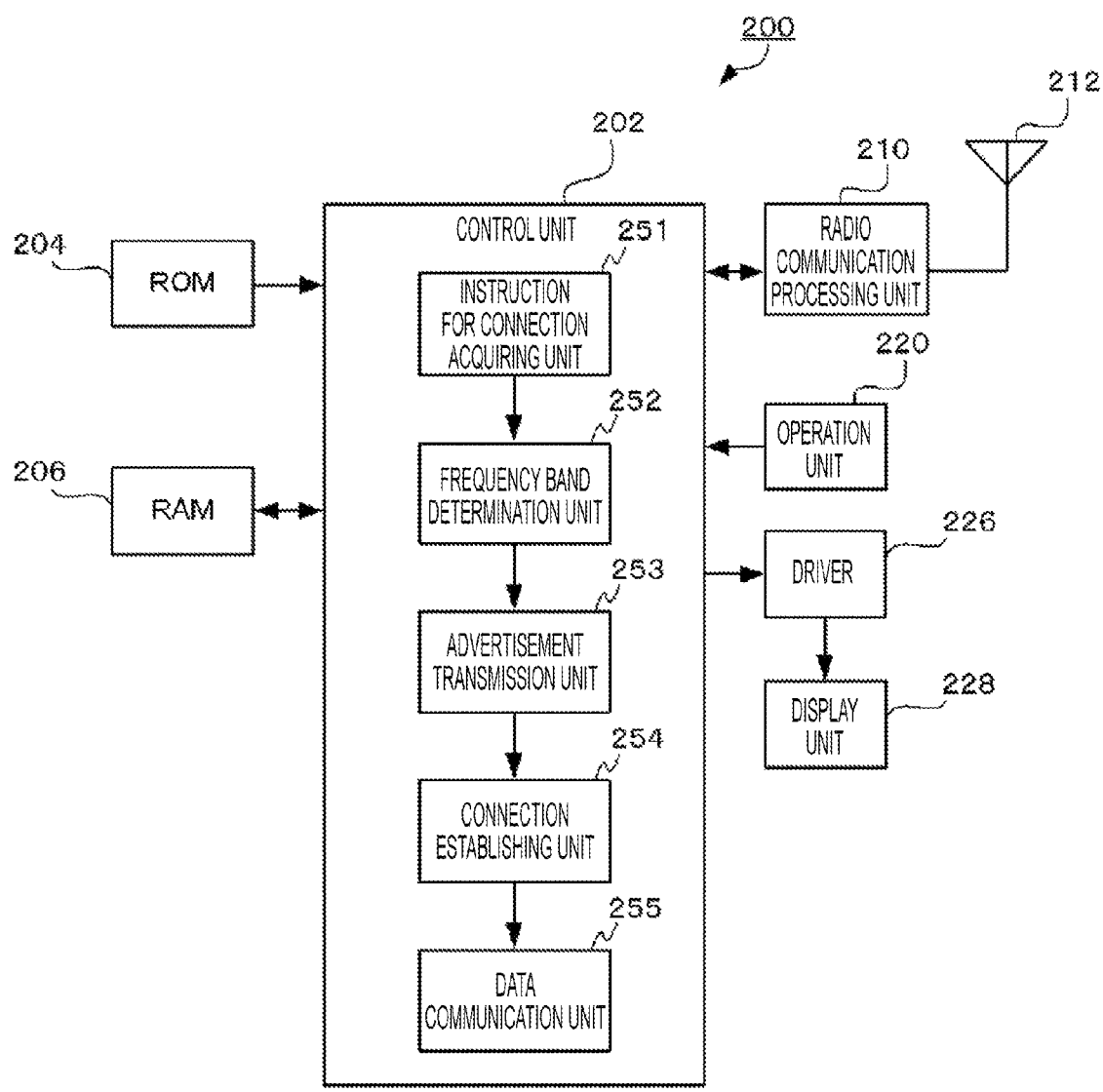
FIG. 4 is a view illustrating a configuration example of a slave device according to the first embodiment of the present invention.
Figure 5:
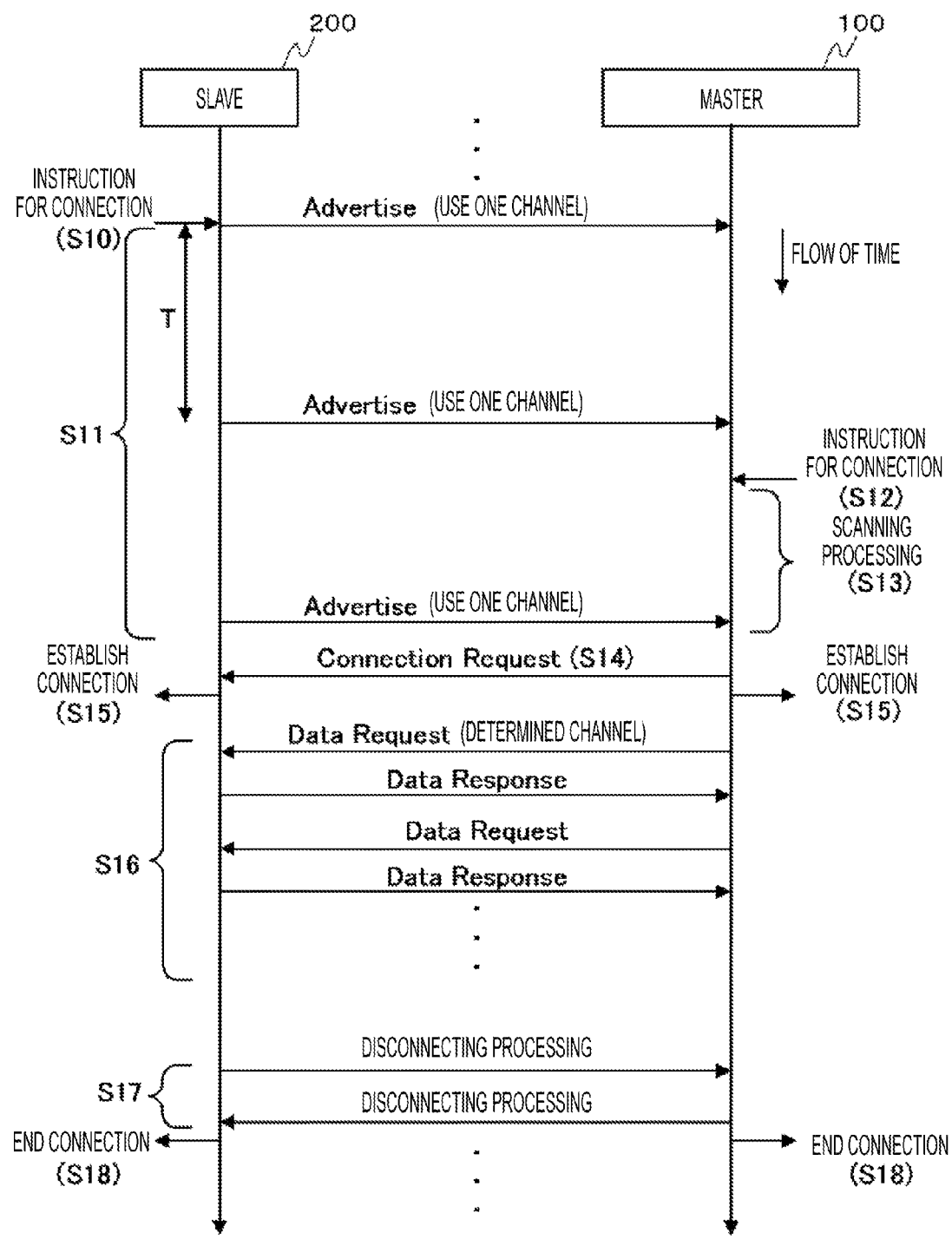
FIG. 5 is a view for describing an operation of the radio communication system in FIG. 1.

FIG. 4 is a block diagram schematically illustrating a configuration example of the slave device 200 according to the first embodiment. As illustrated in FIG. 5, the slave device 200 includes a control unit 202, ROM 204, RAM 206, a radio communication processing unit 210, an antenna 212, an operation unit 220, a driver 226, and a display unit 228.

The control unit 202 includes, for example, a CPU. By executing software processing according to a program (such as program to realize operation of slave device 200 illustrated in FIG. 7 described later) stored in the ROM 204, the control unit 202 controls various functions included in the slave device 200.

The ROM 204 includes non-volatile memory such as flash memory and stores a program or data with which the control unit 202 controls various functions, as described above. In the present embodiment, for example, one channel for advertising used in a case of transmitting an advertisement to the master device 100 executing a predetermined application is recorded in the ROM 204.

The RAM 206 includes volatile memory and is used as a work area where the control unit 202 temporarily stores data to perform various kinds of processing.

The radio communication processing unit 210 includes, for example, a radio frequency (RF) circuit or a baseband (BB) circuit. The radio communication processing unit 210 performs transmission and reception of a radio signal based on the BLE through the antenna 212.

The operation unit 220 includes, for example, a switch and is used to input operation contents such as turning on/off of a power source performed by a user.

The driver 226 outputs, to the display unit 228, an image signal which is based on image data output from the control unit 202. The display unit 228 includes, for example, an LCD or an EL display. The display unit 228 displays an image according to an image signal output from the driver 226.

Next, a functional configuration of the control unit 202 of the slave device 200 will be described. As illustrated in FIG. 4, the control unit 202 functions as an instruction for connection acquiring unit 251, a frequency band determination unit 252, an advertisement transmission unit 253, a connection establishing unit 254, and a data communication unit 255.

The instruction for connection acquiring unit 251 acquires an instruction for connection indicating that transmission of an advertisement is started. For example, when a current date and time becomes a predetermined date and time or when it is necessary to give notice to the master device 100, the instruction for connection acquiring unit 251 acquires an instruction indicating that transmission of an advertisement is started.

The frequency band determination unit 252 determines whether the instruction for connection acquired by the instruction for connection acquiring unit 251 is an instruction for connection with the master device 100 executing a predetermined application. When determining that the acquired instruction for connection is the instruction for connection with the master device 100 executing the predetermined application, the frequency band determination unit 252 determines one channel for advertising previously recorded in the ROM 204 or the like as a channel used for advertising. Also, when determining that the acquired instruction for connection is not the instruction for connection with the master device executing the predetermined application, the frequency band determination unit 252 determines three channels for advertising as channels used for advertising.

The advertisement transmission unit 253 corresponds to an identification information transmission unit and transmits an advertisement to the master device 100 by using the channel for advertising determined by the frequency band determination unit 252.

The connection establishing unit 254 receives a connection request transmitted from the master device 100, which receives the advertisement transmitted from the advertisement transmission unit 253, and establishes connection with the master device 100.

After the connection with the master device 100 is established by the connection establishing unit 254, the data communication unit 255 performs data communication with the master device 100 by using 37 channels for data communication illustrated in FIG. 2.

Next, an example of an operation of the radio communication system 1 according to the present embodiment will be described with reference to a flowchart in FIG. 5.

The slave device 200 acquires information, which indicates that the current time has become the predetermined time, as an instruction for connection with the master device 100 executing the application for acquiring data (step S10). Then, by using one channel for advertising recorded in the ROM 204, the slave device 200 periodically transmits an advertisement to the master device 100 at time intervals T (step S11).

For example, the master device 100 receives, as an instruction for connection with the slave device 200, operation on the touch panel 130 performed by a user during an operation of the application for acquiring data (step S12) and executes scanning processing to receive an advertisement from the slave device 200 (step S13). In the scanning processing, the master device 100 scans the advertisement by using the one channel for advertising recorded in the ROM 104.

When receiving the advertisement from the slave device 200, the master device 100 transmits a connection request to the slave device 200 which transmits the advertisement (step S14). As a result, connection processing is performed in the master device 100 and the slave device 200 and the connection is established (step S15).

After the connection between the master device 100 and the slave device 200 is established, the master device 100 and the slave device 200 perform transmission/reception of data (step S16). A data request is transmitted from the master device 100 to the slave device 200 and the slave device 200 transmits a data response back to the master device 100, whereby the transmission/reception of data is performed.

When the transmission/reception of data between the master device 100 and the slave device 200 is over, the master device 100 and the slave device 200 execute disconnecting operation processing (step S17) and the connection is ended (step S18).

Next, an operation of the master device 100 according to the first embodiment will be described with reference to FIG. 6. FIG. 6 is a flowchart illustrating an example of master device-side scanning processing executed by the control unit 102 of the master device 100 according to the present embodiment. Note that the master device-side scanning processing is performed by the control unit 102 to read and execute a program previously stored in the ROM 104.

Also, it is assumed that one channel for advertising, an index of which channel is "37", is previously recorded in the ROM 104 as a channel used for connection with the slave device 200 when the application for acquiring data is executed.

The control unit 102 of the master device 100 starts the master device-side scanning processing illustrated in FIG. 6, for example, when the instruction for connection acquiring unit 151 acquires, from the application executed in the master device 100, an instruction for connection with the slave device 200.

First, the frequency band determination unit 152 determines whether the acquired instruction for connection is an instruction for connection transmitted from the application for acquiring data (step S101).

When determining that the acquired instruction for connection is the instruction for connection transmitted from the application for acquiring data (step S101; Yes), the frequency band determination unit 152 determines, as a channel used for scanning of this time, the one channel for advertising which is recorded in the ROM 104 and an index of which is "37" (step S102).

When determining that the acquired instruction for connection is not the instruction for connection transmitted from the application for acquiring data (step S101; No), the frequency band determination unit 152 determines all of the three channels for advertising as channels used for scanning of this time (step S103).

Next, the connection establishing unit 153 starts scanning of the slave device 200 by using the channel determined in step S102 or S103 (step S104) and ends the present processing.

After the master device-side scanning processing, the connection establishing unit 153 keeps performing the scanning until an advertisement transmitted from the slave device 200 is received. When receiving the advertisement transmitted from the slave device 200, the connection establishing unit 153 establishes connection with the slave device 200. Then, transmission/reception of data between the master device 100 and the slave device 200 communication with which is established is performed by the data communication unit 154.

Figure 7:
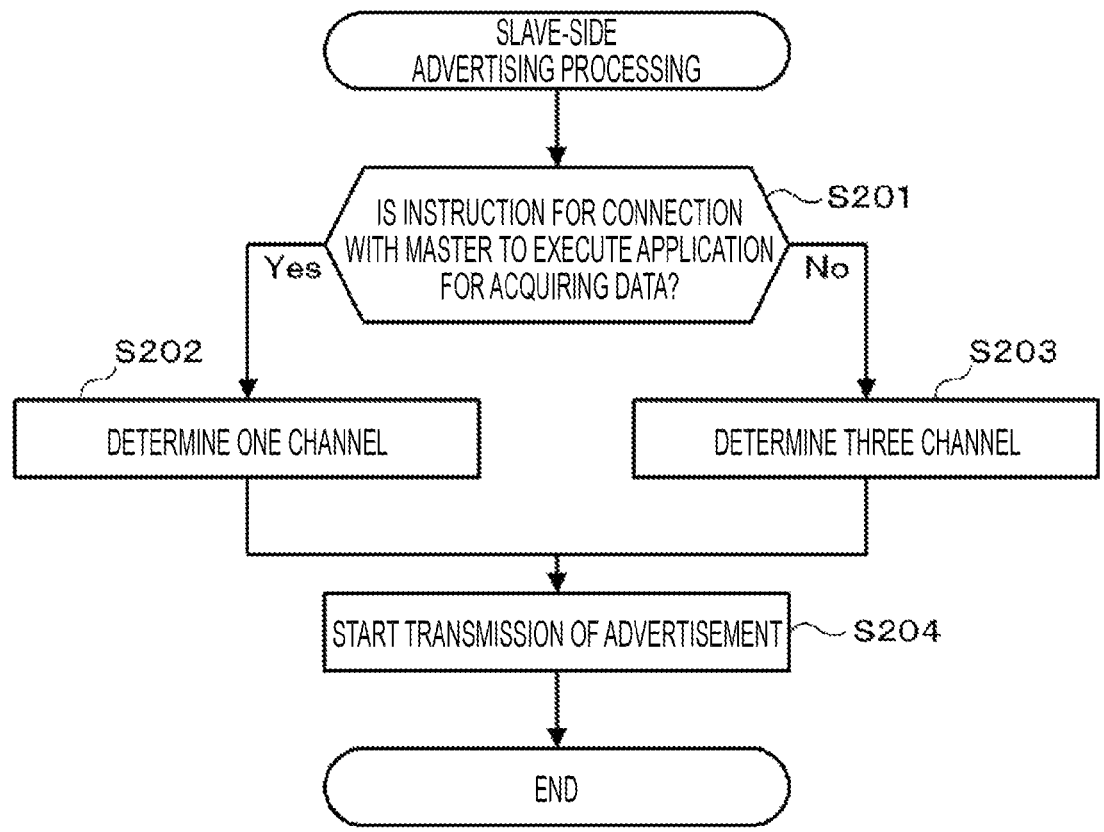
FIG. 7 is a flowchart illustrating an example of slave device-side advertising processing executed by the slave device according to the first embodiment of the present invention.

Next, an operation of the slave device 200 according to the first embodiment will be described with reference to FIG. 7. FIG. 7 is a flowchart illustrating an example of slave device-side advertising processing executed by the control unit 202 of the slave device 200 according to the present embodiment. Note that the slave device-side advertising processing is performed by the control unit 202 to read and execute a program previously stored in the ROM 204. Also, it is assumed that one channel for advertising, an index of which channel is "37", is previously recorded in the ROM 204 as a channel used for transmission of an advertisement to the master device 100 to execute the application for acquiring data. Also, the master device 100 to execute the application for acquiring data is not limited to a specific master device 100 and may be all master devices 100 which use the application for acquiring data.

For example, when the instruction for connection acquiring unit 251 acquires, as an instruction for connection, information indicating that the current time has become the predetermined time, the control unit 202 of the slave device 200 starts the slave device-side scanning processing which is illustrated in FIG. 7.

First, the frequency band determination unit 252 determines whether the acquired instruction for connection is an instruction for connection with the master device 100 to execute the application for acquiring data (step S201).

When determining that the acquired instruction for connection is the instruction for connection with the master device 100 to execute the application for acquiring data (step S201; Yes), the frequency band determination unit 252 determines, as a channel used for advertising of this time, the one channel for advertising which is recorded in the ROM 204 and an index of which is "37" (step S202).

When determining that the acquired instruction for connection is not the instruction for connection with the master device 100 to execute the application for acquiring data (step S201; No), the frequency band determination unit 252 determines all of the three channels for advertising as channels used for scanning of this time (step S203).

Next, the advertisement transmission unit 253 starts transmission of an advertisement to the master device 100 by using the channel determined in step S202 or S203 (step S204) and ends the present processing.

After the slave device-side advertising processing, the connection establishing unit 254 keeps performing the advertising until a connection request transmitted from the master device 100 is received. When the connection request transmitted from the master device 100 is received, the connection establishing unit 254 establishes connection with the master device 100. Then, transmission/reception of data between the slave device 200 and the master device 100 connection with which is established is performed by the data communication unit 255.

As described above, in the master device 100 according to the first embodiment, one channel for advertising is previously set as a channel used for connection with the slave device 200 in a case where a predetermined application is executed. Thus, in a case of establishing connection with the slave device 200 during execution of the predetermined application, by transmitting an advertisement by using the set one channel for advertising, it is possible to control power consumption in scanning of an advertisement of the slave device 200 compared to a case of performing scanning by constantly using all of the three channels for advertising.

Also, in the slave device 200 according to the first embodiment, one channel for advertising is previously set as a channel used for establishing connection with the master device 100 to execute a predetermined application. Thus, in a case of establishing connection with the master device 100 to execute the predetermined application, by transmitting an advertisement by using the set one channel for advertising, it is possible to control power consumption compared to a case where an advertisement is transmitted by constantly using the three channels for advertising.

(Second Embodiment)

In the above first embodiment, the slave device 200 determines a channel used for advertising based on determination whether an acquired instruction for connection is an instruction for connection with the master device 100 executing a predetermined application. However, a method of determining a channel used for advertising is not limited to the above. In the present modification, as a different example of a method of determining a channel used for advertising, an example of determining a channel used for advertising based on a period of time at which communication between a master device 100 and a slave device 200 is performed will be described. Note that in the following description, a similar reference sign is used with respect to a configuration similar to that of the above embodiment and a detailed description thereof is omitted.

A method of determining a channel performed by a frequency band determination unit 252 of the slave device 200 according to the second embodiment will be described.

In the second embodiment, the frequency band determination unit 252 determines whether the time at which an instruction for connection acquiring unit 251 acquires an instruction for connection is in a predetermined period of time for communication. The predetermined period of time for communication is a period of time in which the slave device 200 performs advertising by using one channel. For example, night time from ten in the evening to five in the morning is set since it is considered that communication is not congested in such night time and it is unlikely that reception becomes difficult in the master device 100 even when an advertisement is transmitted by using one channel. In a case where the time at which the instruction for connection acquiring unit 251 acquires an instruction for connection is in the predetermined period of time for communication, the frequency band determination unit 252 determines, as a channel used for advertising, one channel for advertising recorded in ROM 204. Also, in a case where the time at which the instruction for connection acquiring unit 251 acquires an instruction for connection is not in the predetermined period of time for communication, the frequency band determination unit 252 determines three channels for advertising as channels used for advertising.

Also, a frequency band determination unit 152 of the master device 100 according to the second embodiment determines all three channels for advertising as channels used for scanning. This configuration is similar to an operation of a master device in a related art.

Figure 8:
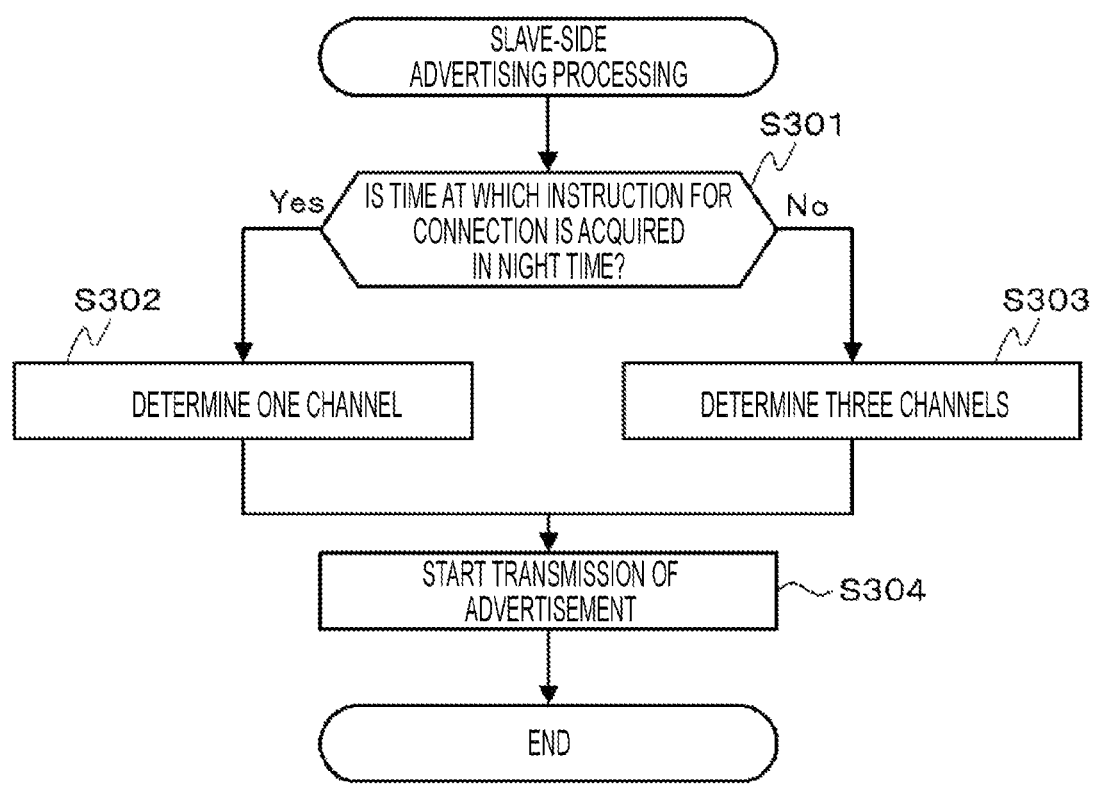
FIG. 8 is a flowchart illustrating an example of slave device-side advertising processing executed by a slave device according to a second embodiment of the present invention.

Next, an operation of the slave device 200 according to the second embodiment will be described with reference to FIG. 8. FIG. 8 is a flowchart illustrating an example of slave device-side advertising processing executed by a control unit 202 of the slave device 200 according to the second embodiment. Note that the slave device-side advertising processing is performed by the control unit 202 to read and execute a program previously stored in the ROM 204. Also, it is assumed that one channel for advertising, an index of which channel is "37", is previously recorded in the ROM 204 as a channel used for transmission of an advertisement to the master device 100 in the night time (ten in the evening to five in the morning).

For example, when the instruction for connection acquiring unit 251 receives, as an instruction for connection, information indicating that the current time has become the predetermined time, the control unit 202 of the slave device 200 starts the slave device-side scanning processing which is illustrated in FIG. 8.

First, the frequency band determination unit 252 determines that the time at which the instruction for connection is acquired is in the night time (step S301).

When determining that the time at which the instruction for connection is acquired is in the night time (step S301; Yes), the frequency band determination unit 252 determines, as a channel used for advertising of this time, the one channel for advertising which is recorded in the ROM 204 and an index of which is "37" (step S302).

When determining that the time at which the instruction for connection is acquired is not in the night time (step S301; No), the frequency band determination unit 252 determines all of the three channels for advertising as channels used for scanning of this time (step S303).

Next, the advertisement transmission unit 253 starts transmission of an advertisement to the master device 100 by using the channel determined in step S302 or S303 (step S304) and ends the present processing.

In the configuration of the second embodiment described above, in the slave device 200, one channel for advertising is previously set as a channel used for establishing connection with the master device 100 in the predetermined period of time for communication. Thus, in the predetermined period of time for communication, by transmitting an advertisement by using the set one channel for advertising, it is possible to control power consumption compared to a case of transmitting an advertisement by constantly using the three channels for advertising.

Also, by selecting a period of time, in which communication is not congested, as a predetermined period of time for communication, the master device 100 can receive an advertisement accurately even when the advertisement is transmitted by using one channel for advertising.

(Third Embodiment)

As an example different from the method of determining a channel used for advertising which method has been described in each of the first and second embodiments, an example of determining a channel used for advertising based on a radio communication environment between a master device 100 and a slave device 200 will be described in the third embodiment. Note that in the following description, a similar reference sign is used with respect to a configuration similar to that of the above embodiments and a detailed description thereof is omitted.

Figure 9:
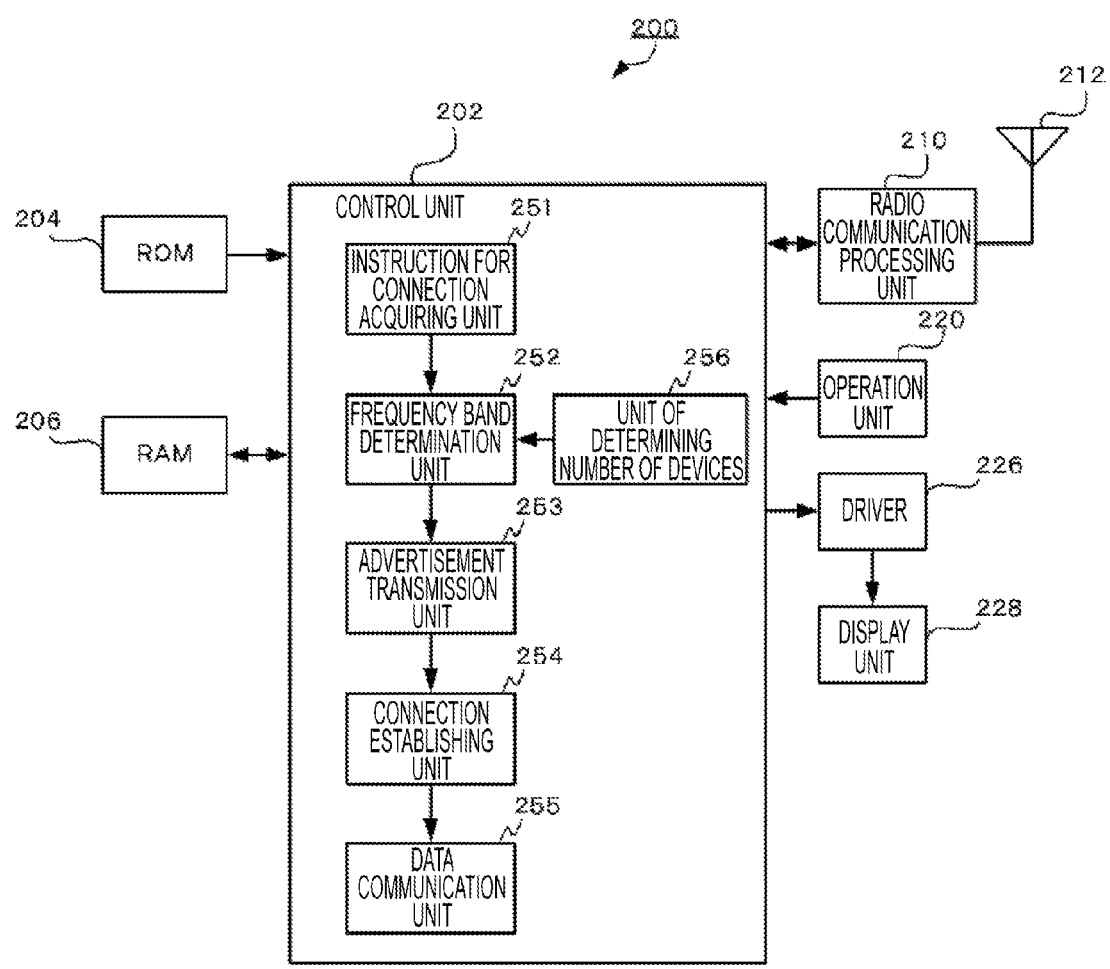
FIG. 9 is a view illustrating a configuration example of a slave device according to a third embodiment of the present invention.

FIG. 9 is a block diagram schematically illustrating a configuration example of the slave device 200 according to the third embodiment. As illustrated in FIG. 9, compared to the first embodiment illustrated in FIG. 4, a control unit 202 further functions as a unit of determining the number of devices 256.

Based on advertisement received from a different slave device 200, the unit of determining the number of devices 256 determines the number of different slave devices 200 placed therearound. For example, by operating as a master device, the unit of determining the number of devices 256 receives an advertisement from the slave device 200 therearound. Note that in a specification of the Bluetooth (registered trademark) 4.1, the slave device 200 can function as the master device 100. That is, the slave device 200 can operate as the master device with respect to the different slave device 200 and can scan an advertisement from the different slave device 200.

Next, a method of determining a channel by a frequency band determination unit 252 of the slave device 200 according to the third embodiment will be described. Based on the number of slave devices 200 determined by the unit of determining the number of devices 256, the frequency band determination unit 252 according to the third embodiment determines a channel used for advertising. When the determined number of slave devices 200 is equal to or smaller than a predetermined threshold, the frequency band determination unit 252 determines one channel for advertising, which is recorded in ROM 204, as a channel used for advertising. Also, when the determined number of slave devices 200 is not equal to or smaller than the predetermined threshold, the frequency band determination unit 252 determines three channels for advertising as channels used for advertising.

Also, a frequency band determination unit 152 of the master device 100 of the third embodiment determines all channels for advertising as channels used for scanning. The configuration is similar to an operation of a master device in a related art.

Figure 10:
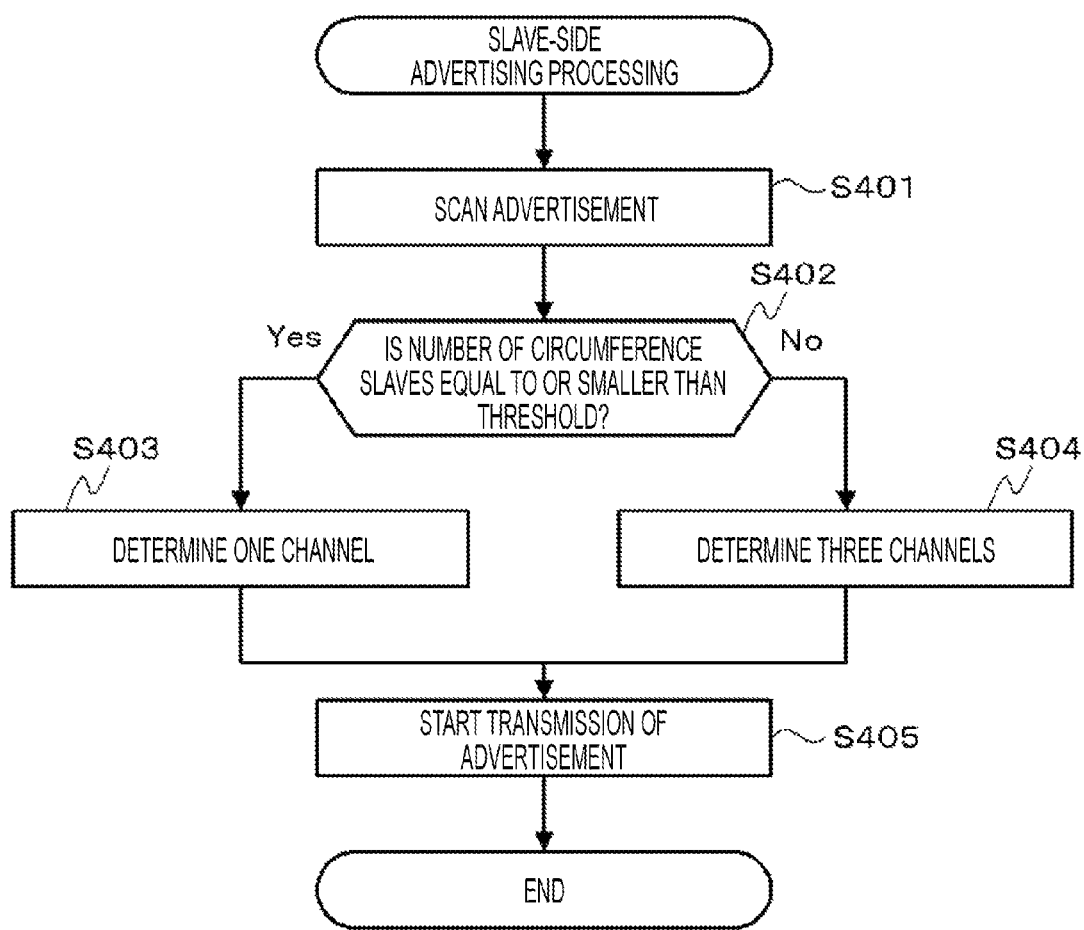
FIG. 10 is a flowchart illustrating an example of slave device-side advertising processing executed by the slave device according to the third embodiment of the present invention.

Next, an operation of the slave device 200 according to the third embodiment will be described with reference to FIG. 10. FIG. 10 is a flowchart illustrating an example of slave device-side advertising processing executed by a control unit 202 of the slave device 200 according to the present embodiment. Note that the slave device-side advertising processing is performed by the control unit 202 to read and execute a program previously stored in the ROM 204. Also, it is assumed that one channel for advertising, an index of which channel is "37", is recorded in the ROM 204 as a channel used for transmission of an advertisement to the master device 100 in a case where the number of circumference slave devices 200 is equal to or smaller than the predetermined threshold.

For example, when an instruction for connection acquiring unit 251 acquires, as an instruction for connection, information indicating that the current time has become the predetermined time, the control unit 202 of the slave device 200 starts the slave device-side scanning processing which is illustrated in FIG. 10.

First, by operating as the master device, the unit of determining the number of devices 256 receives an advertisement from the circumference slave device 200 and determines the number of slave devices 200 placed therearound (step S401).

Next, the frequency band determination unit 252 determines whether the number of circumference slave devices determined in step S401 is equal to or smaller than the predetermined threshold (step S402).

When determining that the number of circumference slave devices is equal to or smaller than the predetermined threshold (step S402; Yes), the frequency band determination unit 252 determines, as a channel used for advertising of this time, the one channel for advertising which is recorded in the ROM 204 and an index of which is "37" (step S403).

When determining that the number of circumference slave devices is not equal to or smaller than the predetermined threshold (step S402; No), the frequency band determination unit 252 determines all of the three channels for advertising as channels used for scanning of this time (step S404).

Next, the advertisement transmission unit 253 starts transmission of an advertisement to the master device 100 by using the channel determined in step S403 or S404 (step S405) and ends the present processing.

In the configuration of the third embodiment described in the above, in the slave device 200, one channel for advertising is previously set as a channel used for establishing connection with the master device 100 in a case where the number of circumference slave devices 200 is equal to or smaller than the predetermined threshold. Thus, by transmitting an advertisement by using the set one channel for advertising in a case where the number of circumference slave devices 200 is equal to or smaller than the predetermined threshold, it is possible to control power consumption compared to a case of transmitting an advertisement by constantly using the three channels for advertising.

Also, the slave device 200 transmits an advertisement by using the one channel for advertising when the number of circumference slave devices 200 is equal to or smaller than the predetermined threshold, that is, when a radio communication environment between the master device 100 and the slave device 200 is not congested. Thus, the master device 100 can receive an advertisement accurately even when the advertisement is transmitted by using the one channel for advertising.

(Modification)

Note that by combining the methods of determining a channel for advertising which methods have been described in the above embodiments, a channel for advertising may be determined. For example, a combination of a method of determining a channel for advertising according to a period of time which method has been described in the second embodiment and a method of determining a channel for advertising according to the number of circumference slave devices 200 which method has been described in the third embodiment may be conducted. In the present modification, an example of determining a channel for advertising based on a period of time and the number of circumference slave devices will be described.

Figure 11:
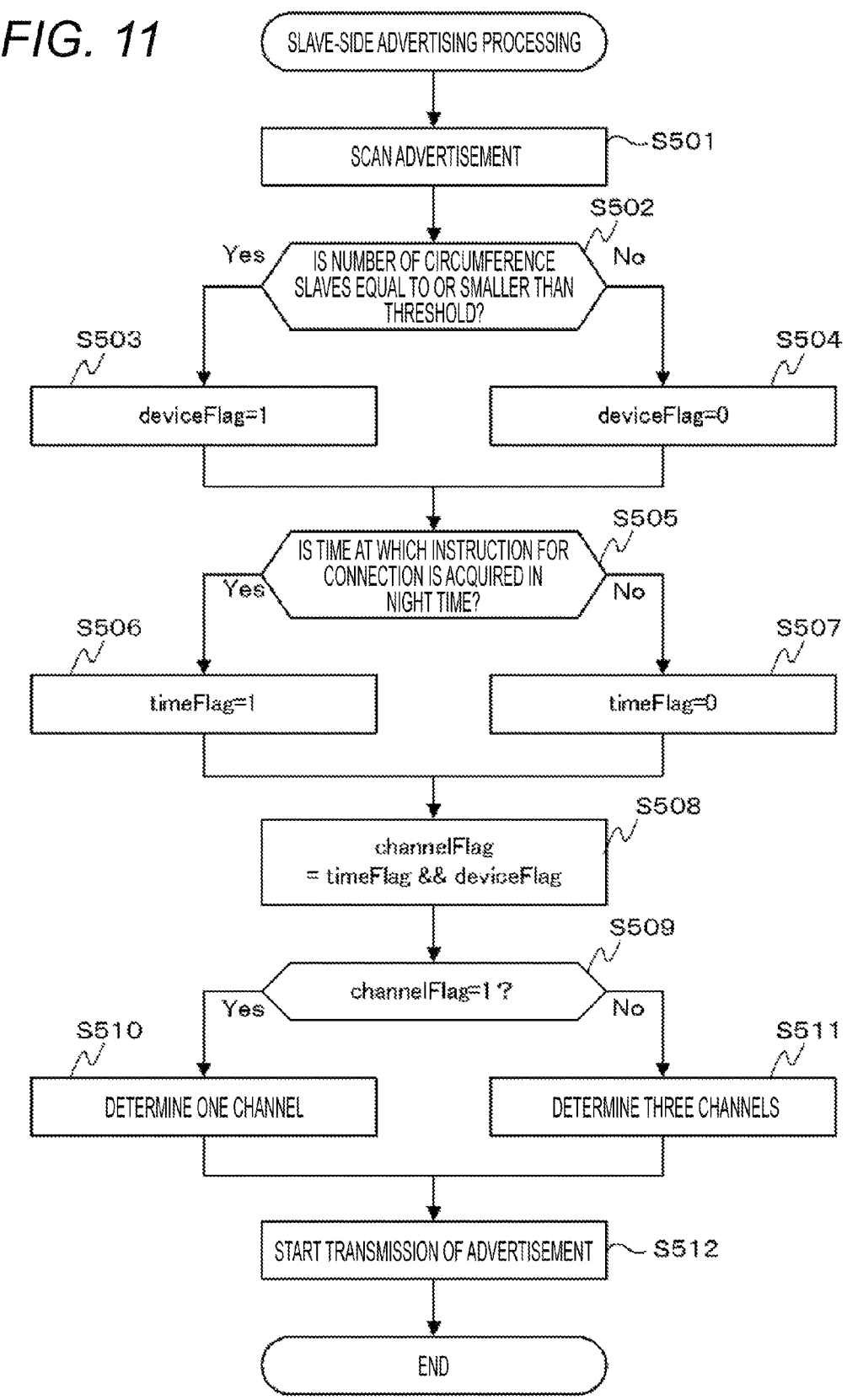
FIG. 11 is a flowchart illustrating an example of slave device-side advertising processing executed by a slave device according to a modification of the present invention.

In FIG. 11, an example of a flowchart of slave device-side advertising processing executed by a control unit 202 of a slave device 200 according to the present modification is illustrated. Note that the slave device-side advertising processing is performed by the control unit 202 to read and execute a program previously stored in the ROM 204. Also, it is assumed that one channel for advertising, an index of which channel is "37", is recorded in the ROM 204 as a channel used for transmission of an advertisement to a master device 100 in a case where the time at which an instruction for connection is acquired is in night time and the number of circumference slave devices 200 is equal to or smaller than a predetermined threshold.

For example, when an instruction for connection acquiring unit 251 acquires, as an instruction for connection, information indicating that the current time has become the predetermined time, the control unit 202 of the slave device 200 starts slave device-side scanning processing which is illustrated in FIG. 11.

First, in steps S501 to S502, the slave device 200 executes processing similar to those in steps S401 to S402 of the slave device-side advertising processing illustrated in FIG. 10.

When determining that the number of circumference slave devices is equal to or smaller than the predetermined threshold (step S502; Yes), the frequency band determination unit 252 sets "1" in deviceFlag (step S503).

When determining that the number of circumference slave devices is not equal to or smaller than the predetermined threshold, that is, when determining that the number of circumference slave devices is larger than a threshold of the number of slave devices (step S502; No), the frequency band determination unit 252 sets "0" in the deviceFlag (step S504).

Next, the frequency band determination unit 252 determines whether the time at which an instruction for connection is acquired is in the night time (step S505).

When determining that the time at which the instruction for connection is acquired is in the night time (step S505; Yes), the frequency band determination unit 252 sets "1" in timeFlag (step S506).

When determining that the time at which the instruction for connection is acquired is not in the night time (step S505; No), the frequency band determination unit 252 sets "0" in the timeFlag (step S507).

Next, the frequency band determination unit 252 calculates channelFlag which is a logical product of the timeFlag and the deviceFlag (timeFlag&&deviceFlag) (step S508). Note that in the present flow, the channelFlag is calculated as a logical product of the timeFlag and the deviceFlag but may be calculated as a logical sum of the timeFlag and the deviceFlag (timeFlag||deviceFlag).

Next, the frequency band determination unit 252 determines whether the channelFlag is "1" (step S509).

When determining that the channelFlag is "1" (step S509; Yes), the frequency band determination unit 252 determines, as a channel used for advertising of this time, one channel for advertising which is recorded in the ROM 204 and an index of which is "37" (step S510).

When determining that the channelFlag is not "1", that is, when determining that the channelFlag is "0" (step S509; No), the frequency band determination unit 252 determines all three channels for advertising as channels used for advertising of this time (step S511).

Next, the advertisement transmission unit 253 starts transmission of an advertisement to the master device 100 by using the channel determined in step S510 or step S511 (step S512) and ends the present processing.

In the configuration of the modification described above, when the time at which an instruction for connection is acquired is in a predetermined period of time and in a case where the number of circumference slave devices is equal to or smaller than a predetermined threshold, the slave device 200 transmits an advertisement by using one prescribed channel. Thus, it is possible to save power compared to a case of performing advertising by constantly using three channels.

In the above, embodiments and modifications of the present invention have been described. However, the present invention is not limited to the above embodiments and modifications.

For example, a method of determining a channel for advertising is not limited to the methods which have been described in the above first to third embodiments and the above modification. For example, the master device 100 and the slave device 200 may be configured to scan or transmit an advertisement by using one prescribed channel in a case where at least one of conditions, which have been described in the above first to third embodiments and the above modification, and a different condition related to radio communication.

Also, in a case where the slave device 200 performs radio communication with a plurality of master devices 100, in the slave device 200, a channel for advertising, which is used in a case where a predetermined condition related to the radio communication is satisfied, may be set for each master device 100 with which the radio communication is performed. For example, in the first embodiment, when the slave device 200 performs radio communication with a master device 100A to execute an application A and a master device 100B to execute an application B, a channel for advertising used for each of the applications A and B may be recorded in the ROM 204 of the slave device 200. Thus, according to a master device with which radio communication is to be performed, the slave device 200 can change a channel for advertising used in a case where a predetermined condition related to radio communication is satisfied.

Also, in the above first to third embodiments and the above modification, a smartphone is used as the master device 100. However, a radio communication apparatus to be the master device 100 is not limited to a smartphone. For example, a watch capable of performing radio communication based on the BLE may be used as the master device 100 and a smartphone or a mobile phone including a function to receive an email may be used as the slave device 200.

As illustrated in FIG. 1, in the above first to third embodiments and the above modification, the radio communication system 1 includes one master device 100 and three slave devices 200. However, the radio communication system 1 may include one or a plurality of master devices 100 and one or a plurality of slave devices 200.

Also, in the master device 100 according to the above first to third embodiments and the above modification, the frequency band determination unit 152 determines one channel among three channels for advertising illustrated in FIG. 2. However, the number of channels determined by the frequency band determination unit 152 is not limited to one and, for example, two channels may be determined. That is, the frequency band determination unit 152 determines less than three channels among the three channels for advertising illustrated in FIG. 2. Accordingly, it is possible to control power consumption compared to a case of executing scanning by constantly using three channels.

Also, in the slave device 200 according to the above first to third embodiments and the above modification, the number of channels determined by the frequency band determination unit 252 is not limited to one and, for example, two channels may be determined. Accordingly, it is possible to control power consumption compared to a case of transmitting an advertisement by constantly using three channels.

Also, the master device 100 and the slave device 200 according to an embodiment of the present invention can be realized not only by a special apparatus but also by a normal computer system. For example, by execution of a program performed by a computer, a function of the master device 100 and a function of the slave device 200 may be realized. A program to realize the function of the master device 100 and the function of the slave device 200 may be stored in a computer-readable recording medium such as a universal serial bus (USB) memory, a secure digital (SD) memory card, a compact disc read only memory (CD-ROM), a digital versatile disc (DVD), a Blu-ray (registered trademark) Disc (BD), or a hard disk drive (HDD) or may be downloaded into a computer through a network. Note that the control unit or the communication unit may be one configuration or a plurality of configurations.

In the above, preferred embodiments of the present invention have been described. However, the present invention is not limited to the specific embodiment. The present invention includes an invention described in the claims and an equivalent thereof.

What is claimed is:

1. A radio communication apparatus configured to perform radio communication with a first radio communication apparatus, comprising:
   a control unit configured to:
   (i) determine whether a predetermined condition is satisfied, the predetermined condition including a predetermined application being executed, the predetermined application being an application in which connection between the radio communication apparatus and the first radio communication apparatus is necessary;
   (ii) determine, as a frequency band used for establishing connection with the first radio communication apparatus, M frequency bands from among N predetermined frequency bands, when the predetermined application is executed (N is a natural number equal to or larger than two and smaller than a number of communicable frequency bands, and M is a natural number smaller than N); and
   (iii) determine the N frequency bands when the predetermined application is not executed; and
   a communication unit configured to transmit identification information to the first radio communication apparatus by using the frequency band determined by the control unit.

2. The radio communication apparatus according to claim 1, wherein the predetermined condition further includes a time, at which the communication unit transmits the identification information, being within a predetermined period of time.

3. The radio communication apparatus according to claim 1, wherein the control unit determines a number of second radio communication apparatuses located around the radio communication apparatus based on identification information received from the second radio communication apparatuses, and wherein the predetermined condition further includes the number of second radio communication apparatuses, which is determined by the control unit, being equal to or smaller than a predetermined threshold.

4. The radio communication apparatus according to claim 1, wherein the control unit establishes connection with the first radio communication apparatus which receives the identification information transmitted from the communication unit.

5. A radio communication apparatus configured to perform radio communication with a different radio communication apparatus, comprising:
a control unit configured to:
(i) determine whether a predetermined application is executed or not, the predetermined application being an application in which connection between the radio communication apparatus and the different radio communication apparatus is necessary;
(ii) determine, as a frequency band used for establishing connection with the different radio communication apparatus, M frequency bands from among N predetermined frequency bands, when the predetermined application is executed (N is a natural number equal to or larger than two and smaller than a number of communicable frequency bands, and M is a natural number smaller than N); and
(iii) determine the N frequency bands when the predetermined application is not executed; and
a communication unit configured to receive identification information, which is transmitted from the different radio communication apparatus, by using the frequency band determined by the control unit,
wherein the control unit establishes connection with the different radio communication apparatus.

6. A radio communication method executed by a radio communication apparatus configured to perform a radio communication with a different radio communication apparatus, comprising:
determining whether a predetermined application is executed or not, the predetermined application being an application in which connection between the radio communication apparatus and the different radio communication apparatus is necessary;
determining, as a frequency band used for establishing connection with the different radio communication apparatus, M frequency bands from among N predetermined frequency bands, when the predetermined application is executed (N is a natural number equal to or larger than two and smaller than a number of communicable frequency bands, and M is a natural number smaller than N);
determining the N frequency bands when the predetermined application is not executed; and
transmitting identification information to the different radio communication apparatus by using the determined frequency band.

7. A radio communication method executed by a radio communication apparatus configured to perform radio communication with a different radio communication apparatus, comprising:
determining whether a predetermined application is executed or not, the predetermined application being an application in which connection between the radio communication apparatus and the different radio communication apparatus is necessary;
determining, as a frequency band used for establishing connection with the different radio communication apparatus, M frequency bands from among N predetermined frequency bands, when the predetermined application is executed (N is a natural number equal to or larger than two and smaller than a number of communicable frequency bands, and M is a natural number smaller than N);
determining the N frequency bands when the predetermined application is not executed; and
establishing connection to receive identification information, which is transmitted from the different radio communication apparatus, by using the determined frequency band, and establishing connection with the different radio communication apparatus.

8. A non-transitory computer-readable medium having stored thereon a program to control a radio communication apparatus to perform radio communication with another radio communication apparatus, the program causing a computer of the radio communication apparatus to perform functions comprising:
determining whether a predetermined application is executed or not, the predetermined application being an application in which connection between the radio communication apparatus and the another radio communication apparatus is necessary;
a first frequency band determination processing to determine, as a frequency band used for establishing connection with the another radio communication apparatus, M frequency bands from among N predetermined frequency bands, when the predetermined application is executed (N is a natural number equal to or larger than two and smaller than a number of communicable frequency bands, and M is a natural number smaller than N);
a second frequency band determination processing to determine the N frequency bands when the predetermined application is not executed, and
identification information transmission processing to transmit identification information to the another radio communication apparatus by using the determined frequency band.

9. A non-transitory computer-readable medium having stored thereon a program to control a radio communication apparatus to perform radio communication with another radio communication apparatus, the program causing a computer of the radio communication apparatus to perform functions comprising:
determining whether a predetermined application is executed or not, the predetermined application being an application in which connection between the radio communication apparatus and the another radio communication apparatus is necessary;
a first frequency band determination processing to determine, as a frequency band used for establishing connection with the another radio communication apparatus, M frequency bands from among N predetermined frequency bands, when the predetermined application is executed (N is a natural number equal to or larger than two and smaller than a number of communicable frequency bands, and M is a natural number smaller than N);

a second frequency band determination processing to determine the N frequency bands when the predetermined application is not executed, and connection establishing processing to receive identification information, which is transmitted from the another radio communication apparatus, by using the determined frequency band, and to establish connection with the another radio communication apparatus.

10. A slave device configured to perform radio communication with a master device based on Bluetooth (registered trademark) lowenergy, comprising:

a control unit configured to:
(i) determine whether a predetermined application is executed or not, the predetermined application being an application in which connection between the master device and the slave device is necessary;
(ii) determine, as a frequency band used for establishing connection with the master device, M (M is a natural number smaller than three) frequency bands from among three frequency bands when the predetermined application is executed; and
(iii) determine the three frequency bands when the predetermined application is not executed; and a communication unit configured to transmit an advertisement to the master device by using the frequency band determined by the control unit.

11. A master device configured to perform radio communication with a slave device based on Bluetooth (registered trademark) lowenergy, comprising:

a control unit configured to:
(i) determine whether a predetermined application is executed or not, the predetermined application being an application in which connection between the master device and the slave device is necessary;
(ii) determine, as a frequency band used for establishing connection with the slave device, M (M is a natural number smaller than three) frequency bands from among three frequency bands when the predetermined application is executed; and
(iii) determine the three frequency bands when the predetermined application is not executed; and a communication unit configured to receive an advertisement, which is transmitted from the slave device, by using the frequency band determined by the control unit, wherein the control unit establishes connection with the slave device.

* * * * *